United States Patent
Miyashita et al.

(10) Patent No.: US 9,733,517 B2
(45) Date of Patent: Aug. 15, 2017

(54) DISPLAY DEVICE

(71) Applicant: Japan Display Inc., Tokyo (JP)

(72) Inventors: Kiyoshi Miyashita, Tokyo (JP); Kimio Anai, Tokyo (JP); Hiroshi Azuma, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/163,099

(22) Filed: May 24, 2016

(65) Prior Publication Data

US 2016/0377914 A1    Dec. 29, 2016

(30) Foreign Application Priority Data

Jun. 24, 2015   (JP) .................................. 2015-126938

(51) Int. Cl.
*G02F 1/1335* (2006.01)
*G02F 1/1333* (2006.01)

(52) U.S. Cl.
CPC .. *G02F 1/133608* (2013.01); *G02F 1/133308* (2013.01); *G02F 1/133512* (2013.01); *G02F 2001/133331* (2013.01); *G02F 2202/28* (2013.01)

(58) Field of Classification Search
CPC ......... G02F 1/133608; G02F 1/133308; G02F 1/133512; G02F 2001/133331
See application file for complete search history.

(56) References Cited

U.S. PATENT DOCUMENTS

| | | | |
|---|---|---|---|
| 7,884,895 B2* | 2/2011 | Kim | G02F 1/133512 349/65 |
| 9,097,926 B2* | 8/2015 | Sato | G02F 1/133351 |
| 9,250,461 B2* | 2/2016 | Tanabe | G02F 1/133308 |
| 2011/0205472 A1* | 8/2011 | Kobayashi | B32B 17/06 349/104 |

FOREIGN PATENT DOCUMENTS

JP        2015-11179        1/2015

* cited by examiner

*Primary Examiner* — Dung Nguyen
(74) *Attorney, Agent, or Firm* — K&L Gates LLP

(57) ABSTRACT

A display device according to an aspect of the present invention includes a cover member and a display panel. The cover member includes a base material and a light-shielding layer provided in a frame-like manner. A double-faced adhesive sheet is provided so as to cover the surface of the base material and an edge portion on an inner circumferential side of the light-shielding layer. A plurality of grooves not deep enough to penetrate the light-shielding layer are provided on the edge portion on the inner circumferential side of the light-shielding layer to which the double-faced adhesive sheet is bonded. The grooves extend from the inner circumference toward an outer circumference of the light-shielding layer. The grooves are arranged side by side along the inner circumference of the light-shielding layer.

3 Claims, 4 Drawing Sheets

DISPLAY DEVICE

CROSS-REFERENCE TO RELATED APPLICATIONS

This application claims priority from Japanese Application No. 2015-126938, filed on Jun. 24, 2015, the contents of which are incorporated by reference herein in its entirety.

BACKGROUND

1. Technical Field

The present disclosure relates to a display device.

2. Description of the Related Art

Display devices are known in which a transparent cover member is bonded to a display surface of a display panel (refer, for example, to Japanese Patent Application Laid-open Publication No. 2015-011179). The display panel and the cover member are bonded to each other with, for example, a double-faced adhesive sheet.

The cover member includes a light-transmitting base material, such as glass, and a frame-like light-shielding layer formed on a surface of the base material. The light-shielding layer is provided in a position rimming a display area of the display panel. The double-faced adhesive sheet is disposed so as to cover the surface of the base material and an edge portion on an inner circumferential side of the light-shielding layer. A step caused by the thickness of the light-shielding layer is formed between a distal surface of the light-shielding layer and the surface of the base material. This configuration tends to generate bubbles in the stepped portion when the double-faced adhesive sheet is bonded so as to lie across the distal surface of the light-shielding layer and the surface of the base material. The bubbles cannot be released out, and hence, remain on the inner circumferential side of the light-shielding layer.

SUMMARY

A display device according to an aspect of the present invention includes a cover member and a display panel that are bonded to each other with a double-faced adhesive sheet. The cover member includes a base material and a light-shielding layer formed on a surface of the base material. The light-shielding layer is provided in a frame-like manner in a position rimming a display area of the display panel. The double-faced adhesive sheet is provided so as to cover the surface of the base material located in a region surrounded by the light-shielding layer and an edge portion on an inner circumferential side of the light-shielding layer. The edge portion on the inner circumferential side of the light-shielding layer to which the double-faced adhesive sheet is bonded is provided with a plurality of grooves not deep enough to penetrate the light-shielding layer. The grooves extend from the inner circumference toward an outer circumference of the light-shielding layer. The grooves are arranged side by side along the inner circumference of the light-shielding layer.

DETAILED DESCRIPTION

Figure 1:
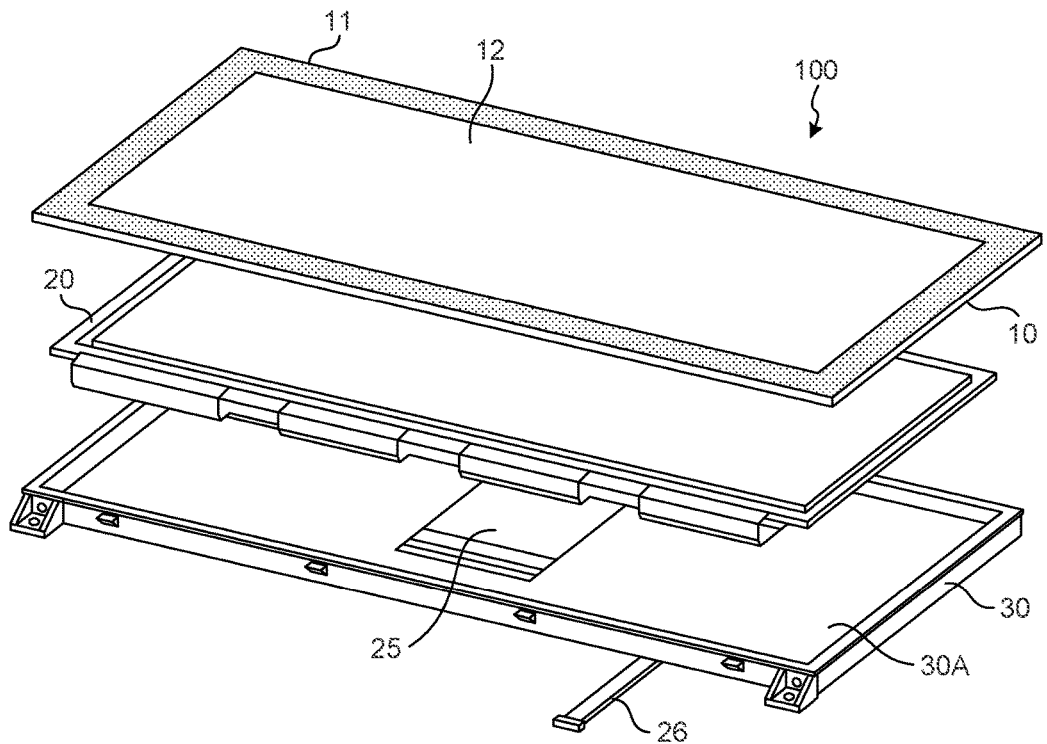
FIG. 1 is an exploded perspective view of a display device according to a first embodiment of the present invention.

Modes (embodiments) for carrying out the invention will be described in detail with reference to the drawings. The present invention is not limited to the description of the embodiments to be given below. Components to be described below include a component or components that is/are easily conceivable by those skilled in the art or substantially the same component or components. Moreover, the components to be described below can be appropriately combined. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, the drawings are merely examples, and interpretation of the invention is not limited to the examples. The same element as that described in one of the drawings that has already been discussed is denoted by the same reference numeral through the description and the drawings, and detailed description thereof will not be repeated in some cases where appropriate.

First Embodiment

Figure 2:
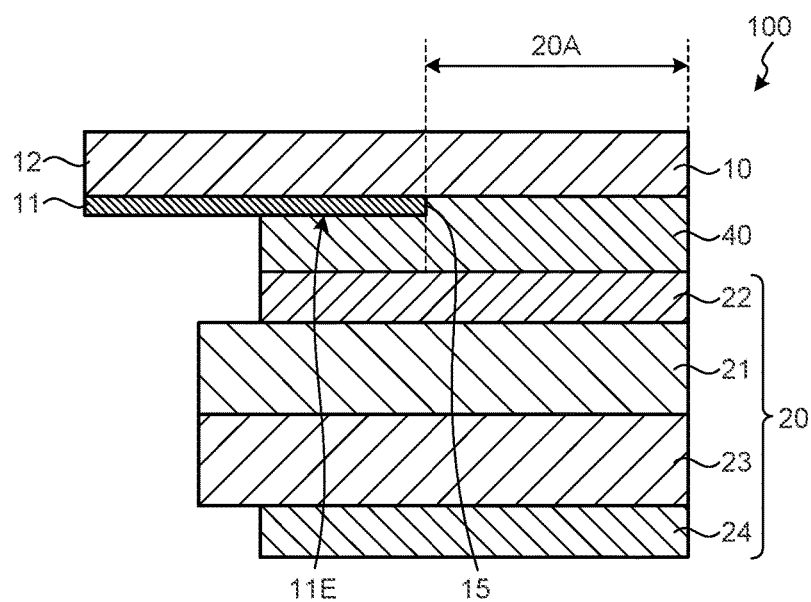
FIG. 2 is a sectional view of a part of the display device.

FIG. 1 is an exploded perspective view of a display device 100 according to a first embodiment of the present invention. FIG. 2 is a sectional view of a part of the display device 100.

As illustrated in FIG. 1, the display device 100 includes a cover member 10, a display panel 20, and an accommodating case 30. As illustrated in FIG. 2, the cover member 10 is bonded to the display panel 20 with a double-faced adhesive sheet 40.

The display panel 20 includes, for example, a first substrate 21, a second substrate 23, a first polarizing plate 22, and a second polarizing plate 24. For example, a liquid crystal layer is provided between the first and the second substrates 21 and 23. The first and the second polarizing plates 22 and 24 are bonded to the outer surfaces of the first and the second substrates 21 and 23, respectively. The central part of the display panel 20 serves as a display area 20A. The cover member 10 is bonded to a display surface (surface of the first polarizing plate 22) of the display panel 20, and, in this state, the display panel 20 is accommodated in the accommodating case 30.

The accommodating case 30 has an accommodating space 30A for accommodating the display panel 20. The accommodating space 30A accommodates the display panel 20 together with a backlight (not illustrated). The cover member 10 protects the display surface of the display panel 20 and serves as a cap member for closing the upper portion of the accommodating space 30A. Reference numerals 25 and 26 in FIG. 1 represent flexible printed circuit boards that are electrically coupled with the display panel 20 and the backlight, respectively.

The cover member 10 includes a base material 12 and a light-shielding layer 11 that is formed on a surface of the base material 12. The base material 12 is constituted by a light-transmitting member, such as a glass member. The light-shielding layer 11 is formed of a member that absorbs visible light. A region surrounded by the light-shielding layer 11 serves as a light-transmitting portion for transmitting visible light. The light-shielding layer 11 is provided in a frame-like manner in a position rimming the display area 20A of the display panel 20. The double-faced adhesive sheet 40 is provided so as to cover the surface of the base material 12 located in the region surrounded by the light-shielding layer 11 and an edge portion 11E on an inner circumferential side of the light-shielding layer 11.

Figure 3:
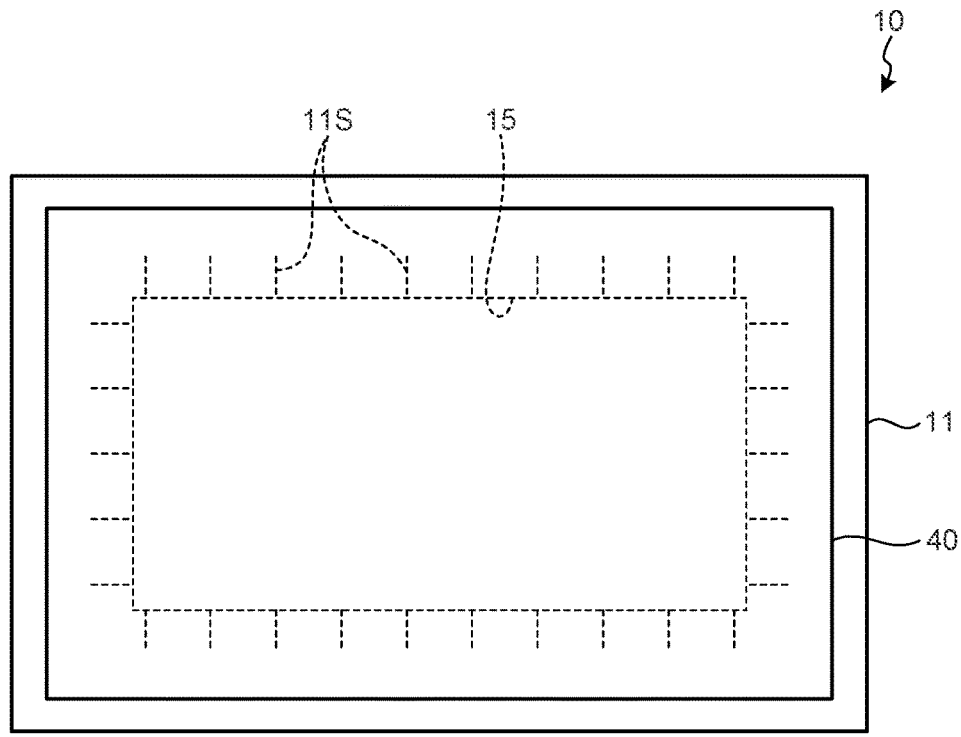
FIG. 3 is a plan view of a cover member as viewed from a double-faced adhesive sheet side.
Figure 4:
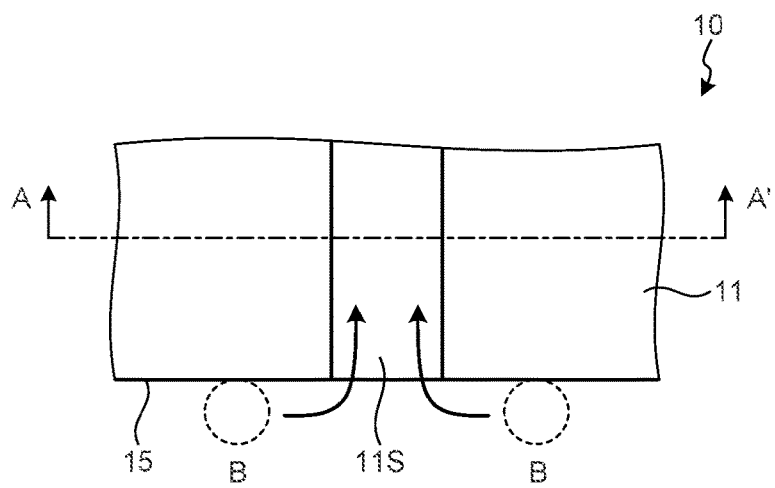
FIG. 4 is an enlarged plan view of a part of the cover member.
Figure 5:
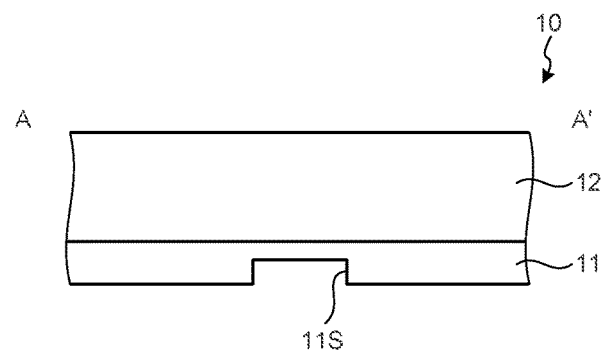
FIG. 5 is a sectional view taken along line A-A' of FIG. 4.

FIG. 3 is a plan view of the cover member 10 as viewed from the double-faced adhesive sheet 40 side. FIG. 4 is an enlarged plan view of a part of the cover member 10. FIG. 5 is a sectional view taken along line A-A' of FIG. 4.

As illustrated in FIGS. 3 to 5, a plurality of grooves 11S not deep enough to penetrate the light-shielding layer 11 are provided on the edge portion 11E (refer to FIG. 2) on an inner circumference 15 side of the light-shielding layer 11 to which the double-faced adhesive sheet 40 is bonded. Each of the grooves 11S extends from the inner circumference 15 of the light-shielding layer 11 toward the outer circumference thereof. The grooves 11S are arranged side by side along the inner circumference 15 of the light-shielding layer 11. Each of the grooves 11S is formed so as to be not long enough to reach the outer circumference of the light-shielding layer 11. Ends of the double-faced adhesive sheet 40 are bonded to the light-shielding layer 11 on an outer circumferential side of the region where the grooves 11S are formed.

As illustrated in FIG. 2, a step caused by the thickness of the light-shielding layer 11 is formed between a distal surface of the light-shielding layer 11 and the surface of the base material 12. This configuration tends to generate bubbles in the stepped portion when the double-faced adhesive sheet 40 is bonded so as to lie across the distal surface of the light-shielding layer 11 and the surface of the base material 12. The bubbles cannot be released out, and hence, remain near the inner circumference of the light-shielding layer 11.

To counter this problem, the grooves 11S are formed on the edge portion 11E on the inner circumference 15 side of the light-shielding layer 11. This configuration allows bubbles B located near the inner circumference 15 of the light-shielding layer 11 to flow into the grooves 11S, as illustrated in FIG. 4. These grooves 11S reduce the bubbles B remaining near the inner circumference of the light-shielding layer 11. The grooves 11S are formed to the depth not large enough to penetrate the light-shielding layer 11, so that portions with the grooves 11S formed thereon also shield the light. As a result, the bubbles B that have flowed into the grooves 11S are kept from affecting display.

Each of the grooves 11S can have any planar shape. In the present embodiment, the planar shape of each groove 11S is a rectangular shape extending in a direction orthogonal to the inner circumference 15 of the light-shielding layer 11, as illustrated in FIG. 4. The grooves 11S are arranged at constant intervals along the inner circumference of the light-shielding layer 11. The planar shape of each groove 11S is not limited to this shape. The planar shape of each groove 11S may be, for example, a shape having a width changing from the inner circumference toward the outer circumference of the light-shielding layer 11. The direction of extension of the grooves 11S is also not limited to the direction orthogonal to the inner circumference 15 of the light-shielding layer 11, but may be a direction intersecting the inner circumference 15 of the light-shielding layer 11 at any angle.

Figure 6:
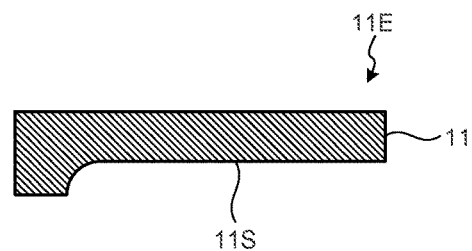
FIG. 6 is a view illustrating an example of a sectional shape of a light-shielding layer taken parallel to the longitudinal direction of a groove.
Figure 7:
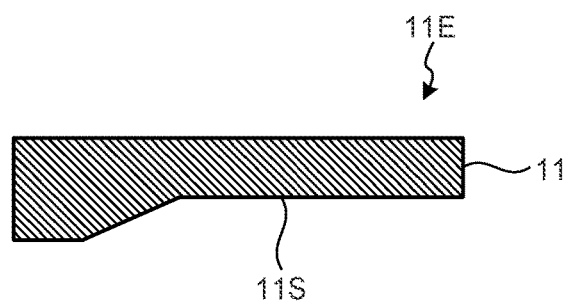
FIG. 7 is a view illustrating another example of the sectional shape of the light-shielding layer taken parallel to the longitudinal direction of the groove.

Each of the grooves 11S can also have any sectional shape. FIGS. 6 and 7 are views illustrating examples of a sectional shape of the light-shielding layer 11 taken parallel to the longitudinal direction of each of the grooves 11S. In the example of FIG. 6, the depth of the groove 11S is substantially constant over the whole length in the longitudinal direction of the groove 11S. An end on the outer circumferential side of the groove 11S is slightly curved. In the example of FIG. 7, the depth of the groove 11S is also substantially constant over the whole length in the longitudinal direction of the groove 11S. The end on the outer circumferential side of the groove 11S is tapered, along which the depth of the groove 11S gradually decreases toward the outer circumference of the light-shielding layer 11.

In the display device 100 of the present embodiment described above, the grooves 11S are formed on the edge portion 11E on the inner circumference 15 side of the light-shielding layer 11, so that the bubbles B generated near the inner circumference 15 of the light-shielding layer 11 flow into the grooves 11S. As a result, the display device 100 can be provided in which the bubbles are difficult to remain near the inner circumference of the light-shielding layer 11. Since the depth of the grooves 11S is smaller than the thickness of the light-shielding layer 11, the light does not leak from the portions with the grooves 11S formed thereon. As a result, the display device 100 with excellent display quality can be obtained.

Second Embodiment

Figure 8:
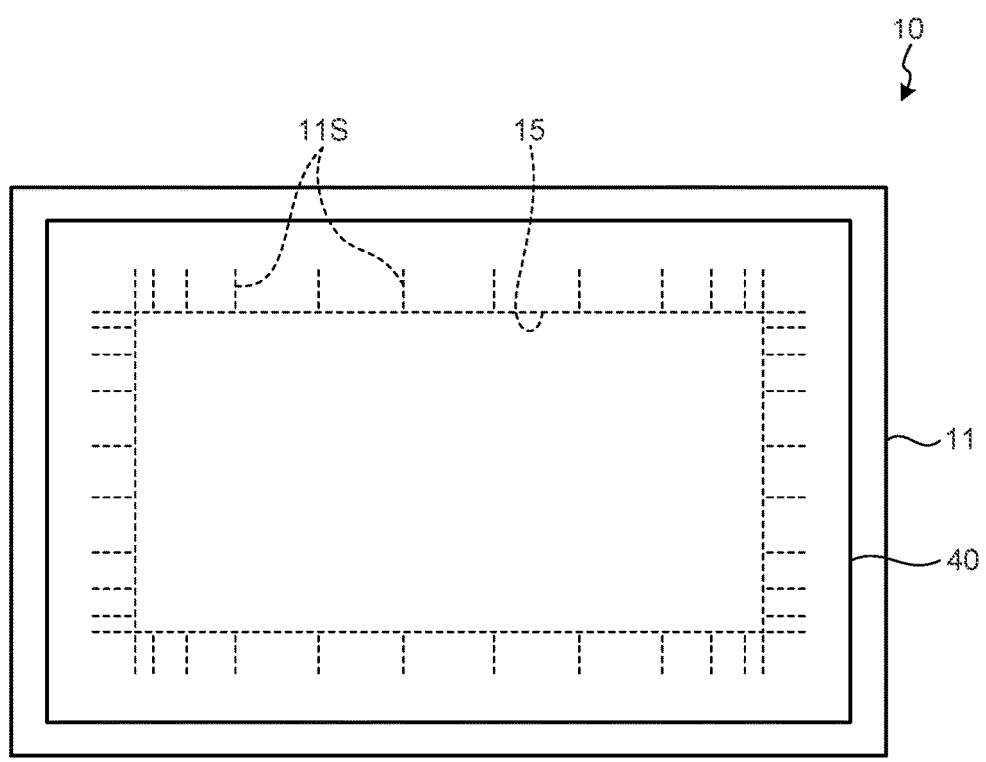
FIG. 8 is a plan view illustrating an arrangement of grooves in a display device according to a second embodiment of the present invention.

FIG. 8 is a plan view illustrating an arrangement of the grooves 11S in a display device according to a second embodiment of the present invention. In the present embodiment, components common to those of the first embodiment are assigned with the same reference numerals, and the detailed description thereof will not be repeated.

The present embodiment differs from the first embodiment in that the space intervals of the grooves 11S have a distribution along the inner circumference 15 of the light-shielding layer 11. In the present embodiment, the light-shielding layer 11 is formed into, for example, a rectangular frame shape, and the space interval between the adjacent grooves 11S decreases as the position thereof is closer to each corner of the inner circumference 15 of the light-shielding layer 11.

As described above, the bubbles tend to be generated near the inner circumference 15 of the light-shielding layer 11. Therefore, the bubbles tend to remain more easily in the corner portion of the inner circumference 15 where two sides thereof intersect than in the middle portion of each sides. In the present embodiment, the space interval between the grooves 11S near the corner portion where the bubbles more easily remain is smaller than the space interval between the grooves 11S provided in the middle portion of each sides. As a result, the bubbles can be efficiently removed.

While the preferred embodiments of the present invention have been described above, the present invention is not limited to such embodiments. The description disclosed in the embodiments is merely an example, and various modifications can be made without departing from the gist of the present invention. Appropriate modifications made without departing from the gist of the present invention also naturally belong to the technical scope of the present invention. All inventions that can be carried out through appropriate modifications by those skilled in the art based on the invention described above also belong to the technical scope of the present invention, as long as the inventions include the gist of the present invention.

What is claimed is:

1. A display device comprising a cover member and a display panel that are bonded to each other with a double-faced adhesive sheet, wherein
   the cover member includes a base material and a light-shielding layer formed on a surface of the base material;
   the light-shielding layer is provided in a frame-like manner in a position rimming a display area of the display panel;
   the double-faced adhesive sheet is provided so as to cover the surface of the base material located in a region surrounded by the light-shielding layer and an edge portion on an inner circumferential side of the light-shielding layer;
   the edge portion on the inner circumferential side of the light-shielding layer to which the double-faced adhesive sheet is bonded is provided with a plurality of grooves not deep enough to penetrate the light-shielding layer;
   the grooves extend from the inner circumference toward an outer circumference of the light-shielding layer; and
   the grooves are arranged side by side along the inner circumference of the light-shielding layer.

2. The display device according to claim 1, wherein
   each of the grooves is formed so as to be not long enough to reach the outer circumference of the light-shielding layer; and
   ends of the double-faced adhesive sheet are bonded to the light-shielding layer on an outer circumferential side of the region where the grooves are formed.

3. The display device according to claim 1, wherein
   the light-shielding layer is formed into a rectangular frame shape; and
   a space interval between adjacent ones of the grooves decreases as the position of the space interval is closer to each corner of the inner circumference of the light-shielding layer.

* * * * *